Oct. 25, 1966       C. O. WEISENBACH           3,280,842
                         VALVE
              Filed Feb. 19, 1965
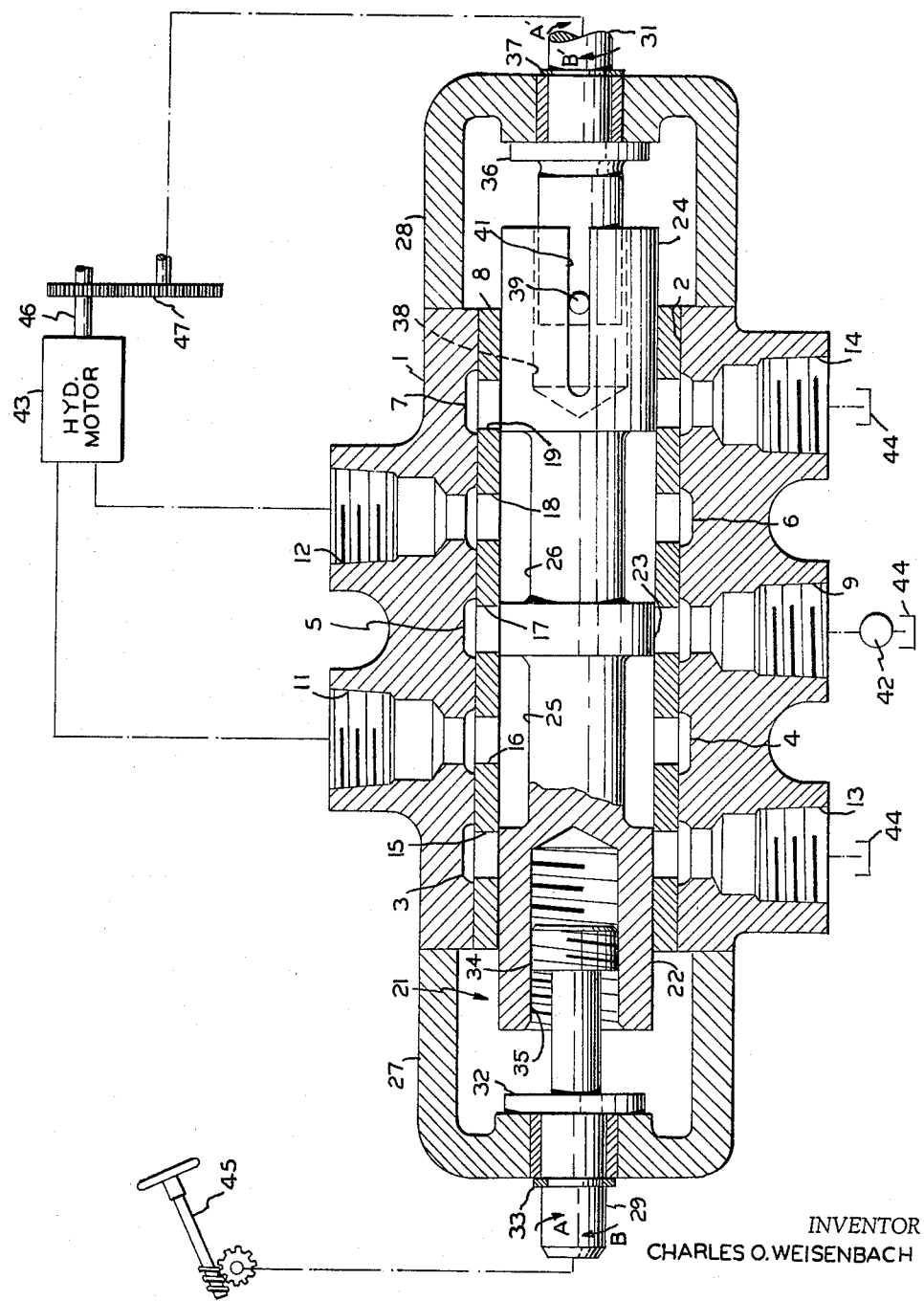
INVENTOR
CHARLES O. WEISENBACH
BY  *Dodge and Sons*
ATTORNEYS

3,280,842
VALVE
Charles O. Weisenbach, Watertown, N.Y., assignor to The New York Air Brake Company, a corporation of New Jersey
Filed Feb. 19, 1965, Ser. No. 433,856
3 Claims. (Cl. 137—625.17)

This invention relates to directional control valves for regulating the flow of hydraulic fluid to and from hydraulic fluid to and from hydraulic motors.

A common prior art valve of this type is the sliding plunger or spool valve used to control double-acting motors. This valve has a neutral position in which both sides of the hydraulic motor are hydraulically locked, and is shiftable in opposite directions from that position to connect a selected side of the motor with a pump and to connect the remaining side with tank. Usually the spool is designed to afford flow graduating action. The valve can be used in an open loop control system to control either the poistion of the rate of movement of the controlled motor, and in this case the spool is positioned exclusively by a manually operated actuating device. The valve may also be used in a closed loop servo system to control either the position of an intermittently running motor or the speed of a continuously running motor. The positional control system requires a summing mechanism which positions the valve spool in accordance with the algebraic difference between the position of an input member and the position of the controlled motor. In the speed control system the valve spool is positioned by the output member of a differential whose inputs are the rotary speeds of the controlled motor and of a reference device. The need for these summing and differential mechanisms, which can be complex, unwieldly and expensive, tends to limit the use of sliding spool directional control valves in closed loop servo systems.

The object of this invention is to provide a simple directional control valve of the sliding spool type which incorporates a mechanical differential that includes a pair of rotary input members that are adapted to be driven directly by an input device and by the controlled motor, respectively, and whose output member is the valve spool itself. This improvement eliminates the need for external motion or position comparing mechanisms and makes more attractive the use of the sliding spool directional control valve in closed loop systems of both the positional and speed control type.

The preferred embodiment of the invention is described herein with reference to the accompanying drawing whose single figure shows the improved valve in longitudinal cross-section together with a schematic representation of the system components with which it is used.

As shown in the drawing, the improved directional control valve includes a housing 1 containing a through bore 2 which is encircled by five longitudinal spaced annular chambers 3–7, and into which is pressed a valve sleeve 8. The central annular chamber 5 communicates with an inlet port 9, the two intermediate chambers 4 and 6 communicate with a pair of motor ports 11 and 12, respectively, and the outer chambers 3 and 7 communicate with a pair of exhaust ports 13 and 14, respectively. The valve sleeve 8 is formed with five spaced sets of radial passages 15–19 which register, respectively, with the annular chambers 3–7, and contains the sliding valve spool or plunger 21. This spool is provided with three valve lands 22, 23 and 24 which are spaced from each other by a pair of annular peripheral grooves 25 and 26. In the illustrated neutral position of the valve spool 21, land 23 overlies and closes radial passages 17, and the lands 22 and 24 overlie and close the radial passages 15 and 19, respectively.

The opposite ends of bore 2 are closed by a pair of end covers 27 and 28 which are attached to the housing 1 by cap screws (not shown). A pair of rotary actuators 29 and 31, which are aligned with the valve spool 21, are journalled in these covers. Actuator 29 is restrained against longitudinal movement by an integral collar 32 and a snap ring 33, which bear against the inner and outer surfaces of end cover 27, and is provided at its inner end with a head 34 carrying right-hand threads. This head is screwed into a threaded axial bore 35 extending into the left end of the valve spool 21. Rotary actuator 31 is restrained against axial movement by an integral collar 36 and a snap ring 37, in the same manner as actuator 29, and extends into an axial bore 38 formed in the right end of valve spool 21. The actuator 31 carries a transverse pin 39 whose ends are received by a pair of diametrically opposed, longitudinal slots 41 formed in spool 21. The pin and slots form a slip joint which causes the valve spool 21 to rotate with, but permits it to move longitudinally relatively to, the actuator 31.

In a typical system, inlet port 9 is connected with a discharge pressure compensated, variable delivery pump 42, motor ports 11 and 12 are connected with the opposite sides of a double-acting rotary hydraulic motor 43, and the exhaust ports 13 and 14 are connected with a tank or a reservoir 44. Although either of the actuators 29 and 31 may serve as the input actuator while the other serves as the feedback actuator, it is assumed in the illustrated embodiment that actuator 29 is the input member. The input actuator 29 is driven by a manually operated handwheel 45, and actuator 31 is driven by the output shaft 46 of motor 43 through a gear train 47.

When the directional control valve is in the illustrated neutral position, annular chambers 4 and 6 are isolated from each other and from the other chambers, and, therefore, hydraulic motor 43 is hydraulically locked. In order to operate motor 43 in one of its two directions of motion, the operator rotates actuator 29 in the direction of arrow A. Since actuator 31 prevents valve spool 21 from rotating, this movement of actuator 29 causes the threaded connection between head 34 and bore 35 to shift spool 21 to the left. As land 23 uncovers radial passages 17, fluid delivered by the pump 42 is transmitted to one side of motor 43 along a path including inlet port 9, annular chamber 5, radial passages 17, peripheral groove 26, radial passage 18, annular chamber 6 and motor port 12. Simultaneously, land 22 uncovers radial passages 15 and opens an exhaust path from the opposite side of motor 43 to tank 44 including motor port 11, annular chamber 4, radial passages 16, peripheral groove 25, radial passages 15, annular chamber 3 and exhaust port 13. The differential between the pressures in the opposite sides of motor 43 causes shaft 46 to move in a direction which produces rotation of actuator 31 in the direction of arrow A'. Inasmuch as the actuator 31 and valve spool 21 are connected to rotate together, the spool 21 now also commences to rotate in the direction of arrow A'. If the input actuator 29 has been brought to rest, the threaded connection between this actuator and valve spool 21 will cause the rotating spool to move to the right toward the illustrated neutral position. When motor 43 reaches the new position called for by the handwheel 45, valve spool 21 will be in the neutral position.

When the handwheel 45 is turned in the opposite direction, the threaded connection between actuator 29 and the valve spool 21 causes the spool to move to the right from the illustrated neutral position and to open a supply path from inlet port 9 to motor port 11, through peripheral groove 25, and to open an exhaust path from motor port 12 to exhaust port 14, through peripheral groove 26. Under these conditions, motor 43 moves in the direction that causes actuator 31 and valve spool 21 to rotate in the direction of arrow B'. In this case, the valve spool 21 shifts to the left when the input actuator 29 is stopped. When correspondence between the positions of handwheel 45 and motor 43 has again been established, valve spool 21 will have returned to its neutral position.

If the input actuator 29 is maintained in motion in direction A, valve spool 21 will move to the left from the neutral position until actuator 31 has been accelerated to the same speed. When the speeds of the two actuators 29 and 31 are equal, the valve spool 21 will cease to move in the longitudinal direction, but, of course, it will continue to rotate. Should the two speeds become unequal for any reason, valve spool 21 will move longitudinally in that direction which will result in restoration of equality. For example, if the speed of actuator 29 is increased, valve spool 21 will move further to the left to uncover a greater portion of radial passages 17, and thus reduce the restriction to flow to motor 43. On the other hand, if the speed of actuator 29 is reduced, valve spool 21 will move to the right and further throttle the flow to motor 43. Obviously the improved valve will perform the same speed control function when actuator 29 is rotated in the direction of arrow B. From this discussion it should be apparent that, depending upon the way in which actuator 29 is driven, the illustrated closed loop servo system will afford either positional or speed control action.

As stated previously, the drawings and description relate only to the preferred embodiment of the invention. Since changes can be made in the structure of this embodiment wtihout departing from the inventive concept, the following claims should provide the sole measure of the scope of the invention.

What I claim is:
1. A servo valve comprising:
 (a) a housing containing a valve bore intersected by longitudinally spaced inlet, exhaust and motor passages;
 (b) a valve member mounted for reciprocation and rotation in the valve bore and having a neutral position in which it isolates the motor passage from the other passages;
 (c) the valve member being shiftable longitudinally in opposite directions from the neutral position to connect the motor passage with the inlet and exhaust passages, respectively;
 (d) first and second separate, valve actuators mounted for rotation in the housing but being constrained against longitudinal movement;
 (e) a threaded connection between the valve member and the first actuator arranged so that relative rotation between the actuator and the valve member in opposite directions causes the valve member to move longitudinally in said opposite directions; and
 (f) a slip joint connecting the valve member with the second actuator, said joint permitting the valve member to move longitudinally in the valve bore but preventing relative rotation between the valve member and the second actuator.

2. A servo valve comprising:
 (a) a housing containing a valve bore intersected by a plurality of longitudinally spaced flow passages, there being a pair of motor passages and inlet and exhaust passages;
 (b) a valve plunger mounted for reciprocation and rotation in the valve bore and having a neutral position in which it isolates each motor passage from the other passages, the valve plunger being shiftable longitudinally in one direction from the neutral position to connect one motor passage with an inlet passage and to connect the other motor passage with an exhaust passage, and being shiftable in the opposite direction from the neutral position to connect said one motor passage with an exhaust passage and to connect said other motor passage with an inlet passage;
 (c) first and second rotary valve actuators journalled in the housing at opposite ends of the valve plunger and aligned with the valve plunger;
 (d) means preventing longitudinal movement of the valve actuators relatively to the housing;
 (e) a threaded connection between one end of the valve plunger and the first actuator so arranged that relative rotation between the first actuator and the valve plunger in opposite directions causes the valve plunger to move longitudinally in said opposite directions; and
 (f) a slip joint connecting the other end of the valve plunger with the second actuator, said joint permitting relative longitudinal movement, but preventing relative rotational movement, between the valve plunger and the second actuator.

3. A servo valve comprising:
 (a) a housing containing a valve bore intersected by five longitudinally spaced passages, there being a central passage, first and second outer passages and first and second intermediate passages;
 (b) a valve plunger mounted for reciprocation and rotation in the valve bore and formed with a central valve land which is separated from first and second outer lands by a pair of peripheral grooves, the valve plunger having a neutral position in which the central land closes the central passage and the first and second outer lands close the first and second outer passages, respectively,
 (c) longitudinal movement of the valve plunger in one direction from the neutral position causing the first outer land and the central land to progressively open flow paths between the first outer and first intermediate passages and between the second intermediate and central passages, respectively, and longitudinal movement of the valve plunger in the opposite direction from the neutral position causing the second outer land and the central land to progressively open flow paths between the second outer and second intermediate passage and between the first intermediate and central passages, respectively;
 (d) a threaded axial bore extending into one end of the valve plunger;
 (e) a first rotary valve actuator journalled in the housing in alignment with the valve plunger and located at said one end of the plunger, the actuator being provided with a threaded portion which is screwed into the threaded axial bore in the valve plunger;
 (f) a second axial bore extending into the opposite end of the valve plunger;
 (g) a second rotary actuator journalled in the housing in alignment with the valve plunger and projecting into said second axial bore;
 (h) a slip joint connecting the valve plunger with the second actuator, said joint preventing relative rotation, but permitting relative longitudinal movement, between these parts; and
 (i) means preventing longitudinal movement of the two actuators relatively to the housing.

No references cited.

M. CARY NELSON, *Primary Examiner.*

W. JOHNSON, *Examiner.*